United States Patent Office 3,280,102
Patented Oct. 18, 1966

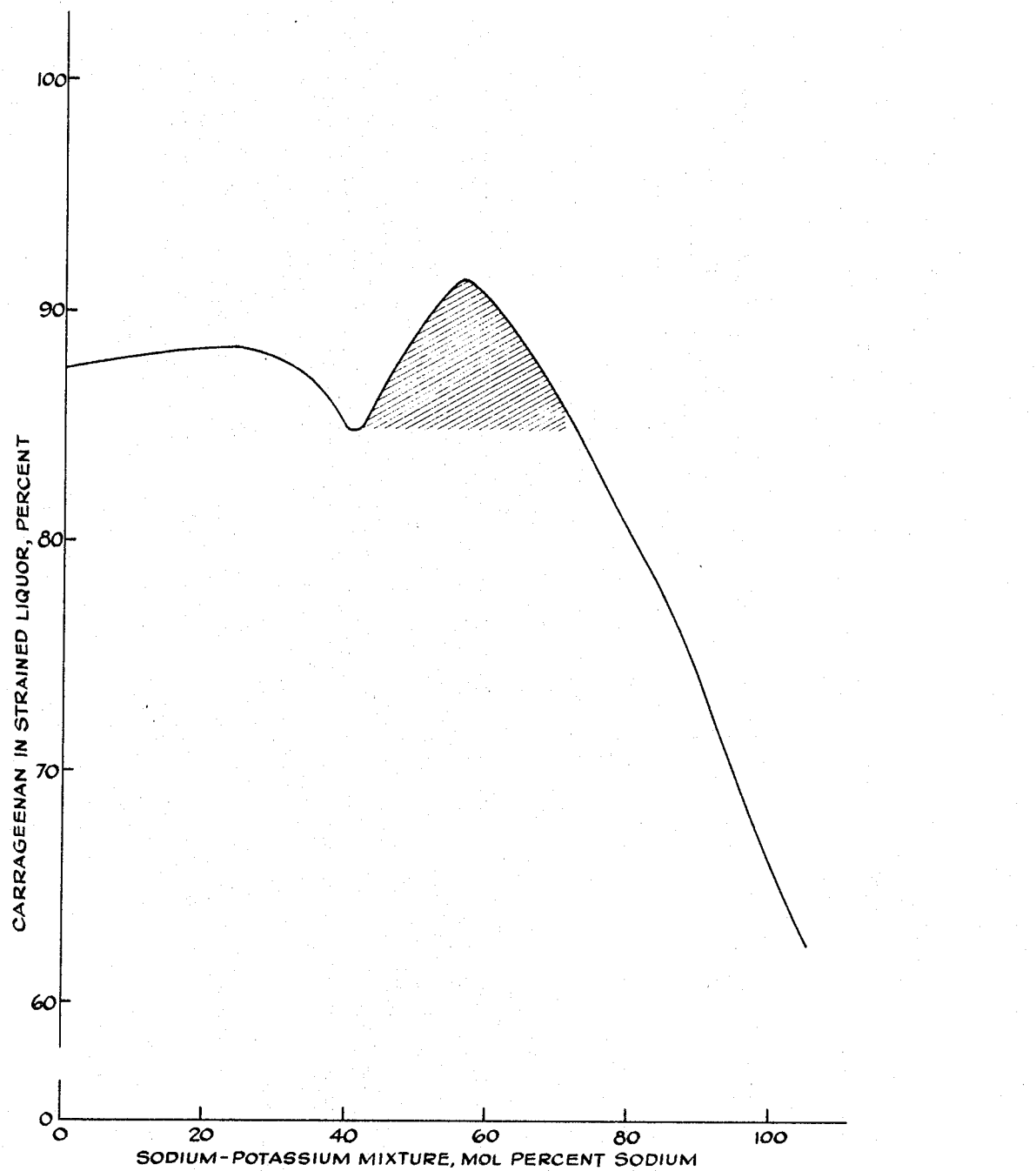

3,280,102
PREPARATION OF CARRAGEENAN HAVING
IMPROVED WATER DISPERSIBILITY
Arthur L. Gordon, Des Plaines, and John J. Jonas, Winnetka, Ill., and Lloyd F. Pike, South Portland, Maine, assignors to National Dairy Products Corporation, New York, N.Y., a corporation of Delaware
Filed Feb. 27, 1964, Ser. No. 347,825
7 Claims. (Cl. 260—209)

The present invention generally relates to a method of manufacturing carrageenan, and more particularly it relates to a carrageenan composition having improved water dispersibility. This application is a continuation-in-part of application Serial No. 2,190,935, filed July 19, 1962, now abandoned.

Carrageenan is an anionic polysaccharide gum having hydrocolloidal properties. Carrageenan is commercially employed for increasing the viscosity of, and otherwise stabilizing, various aqueous systems, for example, chocolate milk, whipping compositions, salad dressings, ice cream, confections and other items. Such gums are also used in paints, inks, drilling compounds, and in various cosmetics and pharmaceutical products.

Carrageenan may be obtained by the alkaline extraction of red marine algae, commonly known as Irish moss or carrageen and is normally marketed in the form of a dry powder which is utilized by dispersing it in water for incorporation into the aqueous system to be stabilized. As used herein, the term "carrageen" is intended to mean Irish moss and the term "carrageenan" is intended to mean the polysaccharide gum extracted from the carrageen. The carrageenan may either be a liquid solution or a dry powder. However, in many instances when carrageenan is added to water at ambient temperature, it has a tendency to "clump"; that is, the partially wetted carrageenan tends to agglomerate into a mass having a gelatinous exterior surface and substantially dry interior. Such clumping inhibits adequate mixing of the carrageenan and water, even under conditions of violent agitation, so that an effective dispersion is difficult to obtain at ambient temperature. In many instances, it is necessary to heat the water to 150° F. or higher in order to effectively disperse the carrageenan.

The dispersibility of carrageenan at ambient temperatures, herein referred to as "cold water dispersibility," is very important, since it enables compounding and blending of a product without a heating step. In this connection the texture, flavor and aroma of various products may be adversely affected if the carrageenan must be dispersed therein at elevated temperatures. In addition to being dispersible in cold water, the carrageenan is desirably non-gelatinous, i.e., it should not form a gelatinous dispersion when mixed with water at ambient temperatures. Further, the carrageenan dispersion preferably has a high viscosity.

The treatment of carrageenan with a single cation such as sodium or potassium is known. However, treatment of gums with a single cation does not result in improved cold water dispersibility which is to be distinguished from warm or hot water dispersibility.

Accordingly, it is a principal object of the present invention to provide an improved carrageenan composition which is readily dispersible in water at ambient temperature to form a non-gelatinous dispersion of high viscosity. It is a further object of the present invention to provide a method for improving the cold water dispersibility of carrageenan. It is also an object of the present invention to provide an improved method of manufacturing carrageenan which provides a non-gelatinous carragenan product having improved cold water dispersibility.

Other objects and advantages of the present invention will become apparent from a study of the following detailed description and of the accompanying drawing, in which is shown:

A single figure which is a graph depicting the effects of mixtures of sodium and potassium ions on the cold water dispersibility of carrageenan.

In general, the present invention comprises treating carrageenan with a mixture of sodium and potassium ions to improve the cold water dispersibility thereof, and more specifically, the invention comprises equilibrating carrageenan with a mixture of sodium ions and potassium ions containing from about 40 to about 70 mol percent sodium ions. The exact mechanism which occurs when the carrageenan is contacted with sodium and potassium ion mixtures is not altogether understood. Thus, for the purposes of the present invention, the term "equilibrating" has been selected.

Treatment of carrageenan with a mixture of sodium and potassium ions in accordance with the present invention effects substantially improved cold water dispersibility and provides a carrageenan which forms a non-gelatinous dispersion of high velocity that is superior to carrageenan treated with a single cation or carrageenan treated with plural cations in concentrations other than those set forth herein.

The single figure of the accompanying drawing illustrates the improved dispersibility of carrageenan which is obtained from equilibration with a mixture of sodium ions and potassium ions. In carrying out the equilibration, the results of which are illustrated in the drawing, various samples of dried Irish moss were chopped, and then washed clean with fresh water at 25° C. on a shaking screen. The washed moss samples were then soaked in 4 percent aqueous chloride salt solutions of differing sodium and potassium ion concentrations for about one and one-half hours at 25° C. The moss was then resoaked under identical conditions with a fresh salt solution of the same sodium and potassium ion concentration and washed to remove occluded salts. The moss samples were then slurried in water and were extracted by heating the mixture to 185° F. with a 1 percent line suspension for a period of two hours. The pH of the carrageenan extract was adjusted to 9.3 with carbon dioxide gas after which the extract was filtered, roll dried and milled and sieved.

The cold water dispersibility of each of the dried treated carrageenan samples was tested according to the following procedure:

Two grams of the dried carrageenan were added to 198 ml. of distilled water at 25° C. The mixture was stirred for 30 seconds with a small glass stirring rod. The resulting slurry was strained through a double thickness 18 mesh per linear inch screen, and the weight of the liquor passing through the screen and the solids content thereof was determined.

Heretofore, the dispersibility of carrageenan was determined by a viscosity measurement, e.g., by determining the flow time of the dispersion through a 50 ml. CV pipette at a particular temperature, generally 25° C. for a cold water dispersibility determination. However, it is believed that the determination of the cold water dispersibility of carrageenan by a measurement of the viscosity of the gum dispersion is not accurate. In this connection, the viscosity of a particular carrageenan dispersion reflects the size of the dispersed carrageenan macromolecules as well as the amount of carrageenan dispersed, and the viscosity of the dispersion will be in part determined by the size of the carrageenan macromolecules. It is believed that a more accurate measurement of the dispersiblity of carrageenan, and particularly the cold water dispersibility thereof, is a measurement of the total solids content of a carrageenan dispersion that has been strained to remove any undispersed carrageenan particles. The total solids content of the strained liquor, as compared to the amount of carrageenan employed to form the dispersion gives a relative measure of the dispersibility of the carrageenan without necessitating a determination of the viscosity of the dispersion.

As shown in the accompanying graph, the percent of the total amount of carrageenan that is dispersed in the strained liquor varies widely depending upon the sodium and potassium ion concentration of the equilibrating solution. When the equilibrating solution contains 100 percent sodium ions, the strained dispersion contains 66 percent of the carrageenan, the remainder being retained on the strainer screen. Conversely, the use of an equilibrating solution containing 100 percent potassium ions provides a strained liquor containing about 87.5 percent of the total amount of carrageenan. However, when the equilibrating solution contains 100 percent potassium ions, the carrageenan dispersion obtained is gelatinous, particularly when the carrageenan is dispersed in cold water. Gelation impedes the true dispersion of carrageenan and is undesirable.

It has been discovered that the carrageenan forms a gelatinous dispersion whenever the equilibrating solution used for treating the carrageenan contains less than about 40 mol percent sodium ions. However, when the equilibrating solution contains in excess of about 40 mol percent sodium ions, the carrageenan is readily dispersible in cold water and forms a desirable non-gelatinous carrageenan dispersion.

Thus, it can be seen that in order to provide a carrageenan having superior properties, the equilibrating solution desirably contains at least about 40 mol percent sodium ions. Additionally, in order to provide carrageenan having improved cold water dispersibility, the sodium-potassium equilibrating solution preferably contains no more than about 70 mol percent sodium ions. An examination of the accompanying graph shows that there is not a sharp breaking point where the addition of a further amount of sodium ions will greatly reduce the cold water dispersibility of the carrageenan. Therefore, the upper sodium ion content of the equilibrating solution of about 70 mol percent may, in certain instances, be exceeded. However, for most purposes, where it is desired that about 85 percent or more of the carrageenan will be dispersed in the strained liquor the sodium ion concentration of the equilibrating solution is preferably maintained at or below about 70 mol percent. Thus, the desired concentration of the sodium-potassium equilibrating solution, as illustrated by the shaded portion of the graph, is from about 40 to about 70 mol percent sodium ions.

As can be seen from the graph, the best cold water dispersibility and the greatest percent of carrageenan is dispersed in the strained liquor when the equilibrating solution contains about 56 mol percent sodium ions. The use of an equilibrating solution of about 50 weight percent sodium chloride and about 50 weight percent potassium chloride is considered to be a preferred form of the present invention. Alternately, the equilibrating solution may comprise a mixture of other soluble sodium and potassium compounds, e.g., sulfate or hydroxides.

It is believed, although the present invention is not limited thereto, that the sodium ions, present in the sodium-potassium mixture react with the carrageenan to form highly hydratable sodium carrageenate salts which are viscous due to the tying up of water molecules around the carrageenan macromolecule. When sodium carrageenate is placed in cold water, a viscous layer is formed which impedes solvation. Potassium salts of carrageenan are less highly hydratable and, as previously stated, are gelatinous. When potassium carrageenate is placed in cold water, a layer of gelatinous material forms which impedes the true dispersion of the carrageenan. In contrast, when a mixture of sodium and potassium carrageenates is mixed with water, an antagonism between cationic sites is believed to occur which slows up the tendency of the sodium carrageenate to hydrate to a sufficient degree to allow the disintegration of clumps of the carrageenate facilitating dispersion thereof. The antagonism may be the result of a difference in the ionic sizes of sodium and potassium which size difference may permit a closer packing of polymeric chains to prevent the undesirably rapid hydration which impedes dispersion. Regardless of what mechanism actually takes place, the results and improvements obtained are clear and reproducible.

The equilibrating solution is generally a dilute aqueous solution, e.g., a solution containing from about 1 percent to about 5 percent by weight of each of the sodium and potassium salts or hydroxides. Alternately other concentrations may be utilized or the sodium and potassium compounds may be added to the extraction liquids in the form of relatively concentrated solutions or in solid form. So long as the carrageenan is contacted with a solution containing sodium and potassium ions in the described mol percentages, beneficial results are obtained and the concentration of the solution is of little consequence.

Equilibration to provide the carrageenan with sodium and potassium ions can be carried out at any appropriate stage in commercial processing, provided that the final dry powder comprising the gum includes equilibrium concentrations of the selected ions. Thus, the Irish moss may be contacted with the sodium and potassium ions prior to extraction or the carrageenan solution may be mixed with an appropriate salt solution after the moss insolubles have been separated by filtering.

The carrageenan may be extracted from the Irish moss in accordance with conventional procedures. Preferably, however, the pH of the carrageenan is adjusted to at least about 6.0 at some point during the extraction. For example, a conventional procedure for the preparation of carrageenan powder from Irish moss is as follows:

Harvested Irish moss is dried, chopped and washed with water to remove foreign matter. The washed moss is then slurried in water, and extracted at temperatures near the boiling point of water in the presence of alkali. Insoluble materials are then filtered from the resulting viscous carrageenan solution and the filtered carrageenan is dried and milled to produce the finished product.

In accordance with the present invention, the sodium and potassium ions may be added during or after any of the steps set forth above and may be added in any suitable form, for example, in the form of their neutral salts or in the form of their hydroxides.

Specific examples of various types of treatment of Irish moss, to which the equilibration step of the present invention may be added, are set forth below.

EXAMPLE I

Chopped, washed Irish moss is slurried in water or in a suitable organic medium such as isopropanol containing the desired concentrations of sodium and potassium salts or hydroxides, etc. After a period of time sufficient for the sodium-potassium mixture to equilibrate with the moss, the soaking liquor is drained and the moss is alkali-extracted and treated in a conventional manner. This is known as a salt soak procedure.

EXAMPLE II

In an acid treatment and neutralization procedure, a slurry of Irish moss in water, prepared as previously described, is acidified, using an acid such as hydrochloric acid, sulfuric acid, or phosphoric acid having a pH between 5.0 and 1.5. The acidification is generally carried out at a temperature of 10° C.–30° C. Other temperatures above and below this range are also satisfactory. The time of acidification can be less than a minute or up to one hour or more, depending on the pH and/or temperature used for acidification. After acidification, the moss slurry is neutralized using a sodium-potassium ion equilibrating solution in accordance with the present invention. The neutralized moss can be extracted as is or further increased in pH to approximately 9.0–9.5 using the described hydroxide mixture or lime. At this point, the moss is extracted and processed in a conventional manner.

EXAMPLE III

In another procedure, a mixture of sodium and potassium salts such as the sulfates or chlorides are added to the moss extract at any time prior to drying. This has the same effect as pretreating the moss by soaking in salt solutions or acidifying and neutralizing.

EXAMPLE IV

In an ion exchange procedure, the Irish moss is suspended in a solvent in which it is essentially insoluble but in which salt solutions are more or less soluble, for example, isopropanol, the solvent being mixed with sufficient water to dissolve the mixed sodium and potassium salts. The moss is maintained in contact with the solvent-salt solution for a period of time long enough for the sodium and potassium ions to equilibrate with the moss. The solution is then filtered and the residual solvent is removed by drying. (If desired, a wash with additional amounts of solvent may be used to remove excess salts and impurities.)

Table I below sets forth the improvement in cold water dispersibility of carrageenan extracts equilibrated during treatment in accordance with Examples I through IV.

*Table I*

| Method of Preparation | Cation Mixture Used In Equilibration | Percent of Total Gum in Strained Liquor |
|---|---|---|
| Example I | NaCl-KCl (2 weight percent of each in water) | 91 |
| Example II | NaOH-KOH (50 weight percent NaOH) | 90.5 |
| Example III | NaCl-KCl (50 weight percent NaCl) | 90 |
| Example IV | NaCl-KCl (35 weight percent NaCl) | 85 |

Table I clearly shows that whatever the particular procedure utilized for the treatment of the carrageenan, the percent of carrageenan solids in the strained liquor (cold water dispersibility) is high. In each instance the strained carrageenan containing liquor was non-gelatinous and had a viscosity (50 ml. CV pipette at 25° C.) in excess of about 100.

Table II below sets forth the results of further comparative tests:

*Table II*

| Method of Treatment | Type of Acid Used | Percent of Total Gum in Strained Liquor |
|---|---|---|
| Acidification of Moss to pH 2.5, Neutralization with NaOH-KOH (58.5 mol percent NaOH) | HCl | 89 |
| Acidification of Moss to pH 2.5, Neutralization with NaOH-KOH (58.5 mol percent NaOH) | H₂SO₄ | 90 |

The high percentage of total solids of both hydrochloric acid-treated and sulfuric acid-treated, sodium-potassium equilibrated carrageenan dispersion clearly indicate that the equilibration step is about equally effective with both types of acid-treated carrageenan.

The following examples further illustrate certain features of the present invention.

EXAMPLE V

Two hundred and twenty-five pounds of dried Irish moss, chopped to a suitable mesh size, was washed on a shaking screen with fresh water at 50° F. The washing was completed in three cycles.

The washed moss was then equilibrated in an aqueous salt solution containing 2 weight percent sodium chloride and 2 weight percent potassium chloride. The moss was gently stirred in this salt solution for 30 minutes to effect ionic equilibrium. The moss with or without draining of the soak liquor was extracted in a jacketed tank, equipped with a stirring mechanism, steam injection system and a thermo-regulating instrument. To facilitate the extraction, electrolytes of alkaline reaction were used, i.e., soluble alkali hydroxides or carbonates. The temperature of the extraction liquid was kept between 180–208° F. At the end of the extraction step a highly viscous carrageenan solution was obtained in which the insoluble residues of the moss were uniformly suspended. The extraction mixture was filtered in the presence of diatomaceous earth. The carrageenan filtrate was of high viscosity and free from solid moss, and had a viscosity in the range of 150–250 c.p.s. at 198° F.

For the removal of color and odor contributing impurities, the crude filtrate was contracted with active carbon. After a suitable contact time, the carbon was filtered from the hot solution. The colorless, high viscosity carrageenan filtrate was roll dried in the presence of suitable release agents. The roll dried sheets of carrageenan were collected, milled and packaged.

The recovered carrageenan was a white, odorless powder. A one percent aqueous solution of the powder had a viscosity of 215 c.p.s. at 98° F. The gel strength of a two percent solution at 10° C. was in the range of 92–118 grams per square centimeter. The powdered carrageenan readily dispersed in water at ambient temperatures at a level of 1 percent upon gentle stirring. A sample of the dispersion was strained through a double thickness 18 mesh screen and the solids content of the liquor was determined. The liquor contained 91.5 percent of the total amount of the carrageenan originally mixed in the water and was non-gelatinous. The strained dispersion displayed a high viscosity, i.e., a flow time of 170–234 seconds in a 50 ml. CV pipette at 25° C.

EXAMPLE VI

Two hundred and sixty-two and one-half pounds of dried Irish moss, chopped to a suitable mesh size, were washed with fresh water on a shaking screen in the temperature range of 45–75° F., for the removal of soluble and insoluble impurities. The washing was conducted essentially in the same manner as described for Example V. The washed moss, without any pretreatment, was extracted in a jacketed tank equipped with a stirring unit, steam injection system and a temperature-regulating instrument. To facilitate the extraction, electrolytes of alkaline reaction were used. Five pounds of potassium chloride and five pounds of sodium chloride were added to the extraction liquid. The temperature of the extraction liquid was raised to 208° F. and the extraction was completed at this temperature. The pH of the extraction liquid was kept in the range of 7.8–8.8. At the end of the extraction step, a carrageenan solution of moderate viscosity was obtained in which insoluble moss residues remained in suspension. A filter aid was dispersed in the solution and the solution was filtered under superatmospheric pressure conditions. The viscosity of the carrageenan filtrate was 120 c.p.s. at 198° F. The carrageenan filtrate was concentrated in suitable vacuum equipment and roll dried. The dried carrageenan was collected and milled in the conventional manner.

The recovered carrageenan was a tan colored powder of slight characteristic odor. A 1 percent aqueous solution, at 98° F., had a viscosity of 85 c.p.s. The gel strength of a two percent solution at 10° C. was in the range of 114–126 grams per square centimeter. The powdered carrageenan, when added to water at a level of 1 percent, dispersed evenly on gentle stirring, and after 1½ minutes displayed a flow time of 60 seconds in a 50 ml. CV pipette, at 25° C. Ninety percent of the total carrageenan was contained in the liquor obtained when the dispersion was strained through a double 18 mesh screen. The carrageenan dispersion was non-gelatinous in nature.

EXAMPLE VII

Two hundred and twenty-five pounds of dried Irish moss, chopped to a suitable mesh size was washed with fresh water on a shaking screen at a temperature of 70° F. for 10 minutes in two cycles. At this point, the moss was free of most of the adhering sea salts and pure enough for the hot extraction step.

The washed moss was suspended in hot water in the presence of alkaline electrolytes. This reaction mixture was heated to 208° F. and the extraction continued to completion. The carrageenan solution was filtered in the presence of diatomaceous earth and the carrageenan filtrate had a viscosity of 188–214 c.p.s. at 198° F. For final clarification, the slightly yellow filtrate was carbon treated at elevated temperatures. After the carbon was filtered off, the filtrate was treated with 3.5 pounds of potassium chloride and 2.5 pounds of sodium chloride (47.6 mol percent sodium ions). A first portion of the treated carrageenan solution was roll dried in the presence of a 5 percent stearylmonoglyceride and milled to a fine powder.

A 1 percent aqueous dispersion of the carrageenan powder at 98° F. had a viscosity of 230 c.p.s.; in a 2 percent solution gel formation was observed. The gel strength of a two percent solution at 10° C. was 101 grams per square centimeter.

The carrageenan, when added to water at 25° C. at a level of 1 percent, dispersed evenly on gentle stirring. When strained through a double 18 mesh screen the liquor obtained contained 87 percent of the total amount of carrageenan employed and was non-gelatinous in nature. The liquor had a flow time of 115 sec. in a 50 ml. CV pipette at 25° C.

The remaining portion of the carrageenan solution was alcohol dehydrated and the resulting coagulum was dried. The properties of the dry carrageenan obtained were essentially the same as the properties of the roll dried carrageenan.

EXAMPLE VIII

Two hundred and sixty-two and one-half pounds of dried Irish moss, chopped to a suitable mesh size, was washed with fresh water on a shaking screen. After two cycles of washing, the washed moss was suspended in a dilute sulfuric acid solution having a pH of 3.0. The moss was soaked under gentle agitation for 15 minutes at 69° F. The mixture was neutralized with a dilute solution of sodium hydroxide and potassium hydroxide, containing 58.5 mol percent sodium ions. The neutralized slurry was heated to 210° F. in the presence of small amounts of calcium hydroxide. After the extraction was completed, the reaction mixture was filtered in the presence of diatomaceous earth. The filtered clear carrageenan solution had a viscosity of 146 c.p.s. at 198° F. The carrageenan was roll dried in the presence of release agents and was milled and sieved.

A slightly gray to tan colored powder was recovered. A one percent aqueous solution of the carrageenan had a viscosity of 264 c.p.s. at 98° F., and its gel strength was 65 grams per square centimeter at 2 percent solids level at 10° C. When added to water at 25° C. at a level of 1 percent, the carrageenan dispersed evenly on gentle stirring. The dispersion was strained through a double 18 mesh screen and the liquor obtained was nongelatinous and contained 89.5 percent of the carrageenan extract. The strained liquor had a flow time of 242 seconds in a 50 ml. CV pipette at 25° C.

The preceding Examples I through VIII illustrate the cold water dispersibility obtained through the equilibration of carrageenan with a mixture of sodium and potassium ions in accordance with the present invention. The resulting carrageenan dispersions are non-gelatinous and have a high viscosity.

Although the preceding description has been largely confined to Irish moss extractive, i.e., carrageenan, improved results in accordance with the present invention are also obtained by the equilibration treatment of other gums such as carboxymethyl cellulose (CMC). However, certain other types of gums are not amenable to such treatment. Thus, polysaccharides such as agar and furcellaran (which are naturally readily dispersible); alginates; and non-ionic polysaccharides such as guar gum usually are not substantially improved by the equilibration treatment of the present invention.

Accordingly, the present invention provides a simple, highly effective and rapid method of increasing the water dispersibility of carrageenan and provides carrageenan which forms a non-gelatinous aqueous dispersion of high viscosity. The method includes treatment of the carrageenan with a mixture of sodium and potassium ions in selected relative concentrations.

Various of the features of the present invention are set forth in the appended claims:

What is claimed is:

1. A method for manufacturing carrageenan having improved cold water dispersibility, which method comprises equilibrating carrageenan with a mixture of sodium ions and potassium ions, said mixture containing from about 40 to about 70 mol percent sodium ions.

2. A method for manufacturing carrageenan having improved cold water dispersibility, which method comprises equilibrating carrageenan with a mixture of sodium ions and potassium ions, said mixture containing about 56 mol percent sodium ions.

3. A method for manufacturing carrageenan having improved cold water dispersibility, which method comprises equilibrating carrageenan with a mixture of sodium ions and potassium ions, said mixture containing from about 40 to about 70 mol percent sodium ions, said sodium and potassium ions being present in the form of a member selected from the group of neutral salts and hydroxides.

4. A method for manufacturing carrageenan having improved cold water dispersibility, which method comprises equilibrating carrageenan with a mixture of sodium ions from sodium chloride and potassium ions from potassium chloride, said mixture containing from about 40 to about 70 mol percent sodium ions.

5. A method for manufacturing carrageenan having improved cold water dispersibility, which method comprises equilibrating carrageenan with a mixture of about 50 weight percent sodium chloride and about 50 weight percent potassium chloride.

6. A method for manufacturing carrageenan having improved cold water dispersibility, which method comprises equilibrating carrageenan with a mixture of about 50 mol percent sodium hydroxide and about 50 mol percent potassium hydroxide.

7. A carrageenan composition produced by the method of claim 1.

References Cited by the Examiner

UNITED STATES PATENTS

| | | | |
|---|---|---|---|
| 2,620,334 | 12/1952 | Nielsen et al. | 260—209 |
| 2,620,335 | 12/1952 | Nielsen et al. | 260—209 |
| 2,624,727 | 1/1953 | Le Gloahec | 260—209 |
| 2,801,955 | 8/1957 | Rutenberg et al. | 260—209 |
| 2,976,274 | 3/1961 | McNeely | 260—209 |
| 3,094,517 | 6/1963 | Stanley | 260—209 |

LEWIS GOTTS, *Primary Examiner.*

JOHNNIE R. BROWN, *Assistant Examiner.*

UNITED STATES PATENT OFFICE
CERTIFICATE OF CORRECTION

Patent No. 3,280,102                          October 18, 1966

Arthur L. Gordon et al.

It is hereby certified that error appears in the above numbered patent requiring correction and that the said Letters Patent should read as corrected below.

Column 2, line 23, for "velocity" read -- viscosity --; line 43, for "line" read -- lime --.

Signed and sealed this 12th day of September 1967.

(SEAL)
Attest:

ERNEST W. SWIDER                        EDWARD J. BRENNER
Attesting Officer                           Commissioner of Patents